(12) United States Patent
Kressin

(10) Patent No.: US 8,746,644 B2
(45) Date of Patent: *Jun. 10, 2014

(54) OVER-THE-DOOR HANGING APPARATUS

(71) Applicant: MCS Industries, Inc., Easton, PA (US)

(72) Inventor: Matthew S. Kressin, Bethlehem, PA (US)

(73) Assignee: MCS Industries, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/028,839

(22) Filed: Sep. 17, 2013

(65) Prior Publication Data

US 2014/0014803 A1    Jan. 16, 2014

Related U.S. Application Data

(63) Continuation of application No. 12/915,747, filed on Oct. 29, 2010, now Pat. No. 8,534,627.

(60) Provisional application No. 61/334,914, filed on May 14, 2010.

(51) Int. Cl.
*A47F 5/00* (2006.01)
*F16M 13/02* (2006.01)
*A47G 1/20* (2006.01)

(52) U.S. Cl.
CPC ............. *A47G 1/20* (2013.01); *F16M 13/02* (2013.01); *A14G 1/1653* (2013.01)
USPC .................. 248/307; 248/323; 211/113

(58) Field of Classification Search
USPC ........... 248/304, 305, 323, 215, 225.21, 307, 248/220.21, 220.22, 220.41, 220.31, 248/220.43; 211/113, 117
See application file for complete search history.

(56) References Cited

U.S. PATENT DOCUMENTS

| | | | |
|---|---|---|---|
| 2,270,796 A | 1/1942 | Hauser | |
| 3,224,715 A | 12/1965 | Maggiore | |
| 5,485,932 A | 1/1996 | Romm et al. | |
| 5,645,178 A * | 7/1997 | Conley, Jr. | 211/87.01 |
| 6,223,914 B1 | 5/2001 | Snell | |
| 6,575,416 B1 | 6/2003 | Avinger | |
| 6,854,610 B2 | 2/2005 | Adams | |
| 6,857,528 B2 | 2/2005 | Klein et al. | |
| 7,188,741 B1 | 3/2007 | Abdi et al. | |
| 7,234,671 B2 | 6/2007 | Avinger | |
| 8,387,838 B2 | 3/2013 | Adams et al. | |
| 2005/0189458 A1 | 9/2005 | Avinger | |
| 2008/0110777 A1* | 5/2008 | Bentley et al. | 206/300 |
| 2008/0245751 A1 | 10/2008 | Moran | |

OTHER PUBLICATIONS

Columbia Frame, Instructions to hang mirror over the door, Columbia Frame Inc., 6251, rue Notre-Dame, Montreal, Quebec H1N 2E9, Nov. 23, 2005.

* cited by examiner

*Primary Examiner* — Steven Marsh
(74) *Attorney, Agent, or Firm* — Belles Katz LLC

(57) ABSTRACT

An apparatus for hanging an article from a door. In one aspect, the inventive apparatus can comprise a mounting system that can be used to hang a mirror, piece of art, or other flat article that is positioned within a frame to a door without the need for a screw driver or any other tools.

16 Claims, 11 Drawing Sheets

OVER-THE-DOOR HANGING APPARATUS

CROSS-REFERENCE TO RELATED PATENT APPLICATIONS

The present application is a continuation application of United States Nonprovisional patent application Ser. No. 12/915,747, now U.S. Pat. No. 8,534,627, which in turn claims the benefit of U.S. Provisional Patent Application Ser. No. 61/334,914, filed May 14, 2010, the entirety of which is hereby incorporated by reference.

FIELD OF THE INVENTION

The present invention relates generally to an over-the-door hanging apparatus, and specifically to an over-the-door hanging apparatus that includes a frame supporting a mirror or piece of art.

BACKGROUND OF THE INVENTION

Mirrors are used often in everyday life. For example, the first thing that a person does after waking up is go to the bathroom and look at him or herself in the mirror. Furthermore, people also typically look at themselves in the mirror prior to leaving the house to make sure that they are pleased with their appearance. A very common room in the home for a person to desire to have a mirror is in the bedroom or the bathroom. However, there is not always a good place to put a mirror in those rooms. Therefore, it has been known to hang a mirror on a wall or on the back of a door by using adhesives, screws, nails or hangers. Doors have been widely used to support mirrors because they provide convenient available space, because they may be removed to facilitate mounting of the mirror, and because they avoid the necessity of placing wall anchors in plaster or drywall.

In addition to mirrors, people are often desirous to hang other articles or objects on the back of a door in order to conserve space while still enjoying the benefits of the article. For example, people may desire to hang a painting, picture or some other framed article from the back of a door. Depending on the person's needs and the space that the person has available, a person may desire to hang any object that may otherwise be hung or attached to a wall from a door instead.

Typical hangers that enable a user to hang a mirror or other article on the back of a door require a user to assemble the hanger onto the rear of the mirror or other article by screwing, gluing or otherwise attaching the hanger directly onto the rear of the mirror or other article. This type of an installation requires a screw driver or glue, which a user or consumer does not always have available. Furthermore, in the case of a screw-type assembly, even if the user has a screwdriver, the user may find it difficult to force the screw into the rear of the mirror or other article because the mirror or other article typically does not have pilot or pre-drilled holes.

Thus, a need exists for an apparatus and/or system that can be used to hang a mirror, piece of art, or other flat article to a door without the need for a screw driver or any other tools. A need also exists for an apparatus and/or system that enables a user to hang a mirror, piece of art, or other flat article from a door in a matter of seconds without the need for excessive physical force and with the ability to adjust its hanging height.

SUMMARY OF THE INVENTION

These objects and others, which will become apparent from the following disclosure and drawings, are achieved by the present invention which, in one aspect, can be an over-the-door hanging apparatus comprising: a frame having a rear surface and supporting a flat article, the frame comprising a first channel in the rear surface of the frame, a second channel in the rear surface of the frame, the first and second channels located on opposite sides of a vertical centerline of the frame; a first mounting plate and a second mounting plate, each of the first and second mounting plates comprising a first edge, a second edge, a third edge, and a vertical axis intersecting the first, second and third edges, the first edge spaced a first distance from the second edge along the vertical axis and the second edge spaced a second distance from the third edge along the vertical axis, wherein the first and second distances are substantially equal; the first mounting plate secured to the rear surface of the frame so that the vertical axis of the first mounting plate is coextensive with the first channel and the first, second, and third edges of the first mounting plate extend transverse to the first channel; the second mounting plate secured to the rear surface of the frame so that the vertical axis of the second mounting plate is coextensive with the second channel and the first, second, and third edges of the second mounting plate extend transverse to the second channel; a bracket assembly comprising a front surface, a rear surface, a first pair of vertically aligned hooks extending outwardly from the front surface of the bracket assembly, each of the hooks of the first pair forming a slot, wherein the hooks of the first pair are spaced from one another by a third distance that is substantially equal to the first and second distances, a second pair of vertically aligned hooks extending outwardly from the front surface of the bracket assembly, each of the hooks of the second pair forming a slot, wherein the hooks of the second pair are spaced from one another by the third distance, and at least one bracket extending from the rear surface of the bracket assembly for engaging a top edge of the door; and wherein the frame is alterable between: (1) being slidably mounted to the bracket assembly by the first pair of hooks extending into the first channel so that the first and second edges of the first mounting plate are located within the slots of the hooks of the first pair, and the second pair of hooks extending into the second channel so that the first and second edges of the second mounting plate are located within the slots of the hooks of the second pair; and (2) being slidably mounted to the bracket assembly by the first pair of hooks extending into the first channel so that the second and third edges of the first mounting plate are located within the slots of the hooks of the first pair, and the second pair of hooks extending into the second channel so that the second and third edges of the second mounting plate are located within the slots of the hooks of the second pair.

In another aspect, the invention can be an over-the-door hanging apparatus comprising: a frame having a rear surface and supporting a flat article, the frame comprising a channel in the rear surface of the frame; a mounting plate comprising a first edge, a second edge, a third edge, and an axis intersecting the first, second and third edges, the mounting plate secured to the rear surface of the frame so that the axis of the mounting plate is coextensive with the channel and the first, second, and third edges of the mounting plate extend transverse to the channel; a bracket assembly comprising a front surface, a rear surface, a pair hooks extending outwardly from the front surface of the bracket assembly, each of the hooks forming a slot, and at least one bracket extending from the rear surface of the bracket assembly for engaging a top edge of the door, wherein the frame is alterable between (1) being slidably mounted to the bracket assembly at a first height by the hooks extending into the channel so that the first and second edges of the mounting plate are located within the slots of the hooks; and (2) being slidably mounted to the bracket assembly at a second height that is different than the first height by the hooks extending into the channel so that the second and third edges of the mounting plate are located within the slots of the hooks.

In yet another aspect, the invention can be an over-the-door hanging apparatus comprising: a frame having a rear surface and supporting a flat article, a first channel in the rear surface of the frame, a second channel in the rear surface of the frame, the first and second channels located on opposite sides of a centerline of the frame; a first flat plate secured to the rear surface of the frame so as to overlie a top portion of the first channel and leave a bottom portion of the first channel unobstructed; a second flat plate secured to the rear surface of the frame so as to overlie a top portion of the second channel and leave a bottom portion of the second channel unobstructed; a bracket assembly comprising a front surface, a rear surface, a first hook extending outwardly from the front surface of the bracket assembly, a second hook extending outwardly from the front surface of the bracket assembly, and at least one bracket extending from the rear surface of the bracket assembly for engaging a top edge of the door; and the frame slidably mounted to the bracket assembly by the first hook extending into the top portion of the first channel via the bottom portion of the first channel and the second hook extending into the top portion of the second channel via the bottom portion of the second channel.

In still another aspect, the invention can be an over-the-door hanging apparatus comprising: a frame having a rear surface and supporting a flat article, the frame comprising a first channel in the rear surface of the frame, a second channel in the rear surface of the frame, the first and second channels located on opposite sides of a vertical centerline of the frame; a first mounting plate and a second mounting plate, each of the first and second mounting plates comprising a first edge, a second edge spaced from the first edge, and an axis intersecting the first and second edges, the first mounting plate secured to the rear surface of the frame so that the axis of the first mounting plate is coextensive with the first channel and the first and second edges of the first mounting plate extend transverse to the first channel, the second mounting plate secured to the rear surface of the frame so that the axis of the second mounting plate is coextensive with the second channel and the first and second edges of the second mounting plate extend transverse to the second channel; a bracket assembly comprising a front surface, a rear surface, a first hook extending outwardly from the front surface of the bracket assembly so as to form a first slot, a second hook extending outwardly from the front surface of the bracket assembly so as to form a second slot, and at least one bracket extending from the rear surface of the bracket assembly for engaging a top edge of the door; wherein the frame is alterable between: (1) being slidably mounted to the bracket assembly at a first height by the first hook extending into the first channel so that the first edge of the first mounting plate is located within the first slot, and the second hook extending into the second channel so that the first edge of the second mounting plate is located within the second slot; and (2) being slidably mounted to the bracket assembly at a second height that is different than the first height by the first hook extending into the first channel so that the second edge of the first mounting plate is located within the first slot, and the second hook extends into the second channel so that the second edge of the second mounting plate is located within the second slot.

In a further aspect, the invention can be an over-the-door hanging apparatus comprising: a frame having a rear surface and supporting a flat article, the frame comprising a first channel in the rear surface of the frame, and a second channel in the rear surface of the frame, the first and second channels located on opposite sides of a centerline of the frame; a first mounting plate and a second mounting plate, each of the first and second mounting plates comprising a first edge, a second edge, a third edge, and an axis intersecting the first, second and third edges, the first mounting plate secured to the rear surface of the frame so that the first, second, and third edges overlie the first channel, the second mounting plate secured to the rear surface of the frame so that the first, second, and third edges of the second mounting plate overlie the second channel; a bracket assembly comprising a front surface, a rear surface, a first pair of hooks extending outwardly from the front surface of the bracket assembly, each of the hooks of the first pair forming a slot, a second pair of hooks extending outwardly from the front surface of the bracket assembly, each of the hooks of the second pair forming a slot, and at least one bracket extending from the rear surface of the bracket assembly for engaging a top edge of the door; wherein the frame is alterable between: (1) being slidably mounted to the bracket assembly at a first height by the first pair of hooks extending into the first channel so that the first and second edges of the first mounting plate are located within the slots of the hooks of the first pair, and the second pair of hooks extending into the second channel so that the first and second edges of the second mounting plate are located within the slots of the hooks of the second pair; and (2) being slidably mounted to the bracket assembly at a second height that is different than the first height by the first pair of hooks extending into the first channel so that the second and third edges of the first mounting plate are located within the slots of the hooks of the first pair, and the second pair of hooks extending into the second channel so that the second and third edges of the second mounting plate are located within the slots of the hooks of the second pair.

In an even further aspect, the invention can be an over-the-door hanging apparatus comprising: a frame having a rear surface, a vertical centerline and supporting a flat article; a first mounting plate and a second mounting plate, each of the first and second mounting plates comprising a first edge, a second edge, a third edge, and a vertical axis intersecting the first, second and third edges, the first and second mounting plates secured to the rear surface of the frame on opposite sides of the vertical centerline; a bracket assembly comprising a front surface, a rear surface, a first pair of hooks extending outwardly from the front surface of the bracket assembly, each of the hooks of the first pair forming a slot, a second pair of hooks extending outwardly from the front surface of the bracket assembly, each of the hooks of the second pair forming a slot, and at least one bracket extending from the rear surface of the bracket assembly for engaging a top edge of the door; wherein the frame is alterable between: (1) being slidably mounted to the bracket assembly at a first height by the first and second edges of the first mounting plate being slid into the slots of the hooks of the first pair, and the first and second edges of the second mounting plate being slid into the slots of the hooks of the second pair; and (2) being slidably mounted to the bracket assembly at a second height that is different than the first height by the second and third edges of the first mounting plate being slid into the slots of the hooks of the first pair, and the second and third edges of the second mounting plate being located within the slots of the hooks of the second pair.

In an even further aspect, the invention can be an over-the-door hanging apparatus comprising: a frame comprising an outer edge, an inner edge defining a central opening, and a rear surface; a mirror positioned within the central opening of the frame; a first mounting plate and a second mounting plate, the first and second mounting plates secured to the rear surface of the frame on opposite sides of a vertical centerline of the frame, the first mounting plate comprising a first mounting element, the second mounting plate comprising a first mounting element; a first elongate member comprising a first mounting element and a first bracket for slidably engaging a top edge of a door; a second elongate member comprising a first mounting element and a second bracket for slidably engaging the top edge of the door; the frame slidably mounted to the first elongate member through slidable mating between at least the first mounting element of the first mounting plate and the first mounting element of the first elongate member; and the frame slidably mounted to the second elongate member through slidable mating between at least the first mounting element of the second mounting plate and the first mounting element of the second elongate member.

In a yet further aspect, the invention can be an over-the-door hanging apparatus comprising: a frame comprising an outer edge, an inner edge defining a central opening, and a rear surface; a flat article positioned within the central opening of the frame; a first mounting plate and a second mounting plate, the first and second mounting plates secured to the rear surface of the frame on opposite sides of a vertical centerline of the frame, the first mounting plate comprising a first edge, the second mounting plate comprising a first edge, the first edge of the first mounting plate being vertically aligned with the first edge of the second mounting plate; a bracket assembly comprising at least one bracket for engaging a top edge of the door, a first hook, and a second hook; the frame slidably mounted to the bracket assembly through slidable mating between: (1) the first edge of the of the first mounting plate and the first hook of the bracket assembly; and (2) the first edge of the of the second mounting plate and the second hook of the bracket assembly.

In still another aspect, the invention can be an over-the-door hanging apparatus comprising: a frame comprising a central opening and a rear surface; a flat article positioned within the central opening of the frame; first and second mounting elements located on the rear surface of the frame on opposite sides of a vertical centerline of the frame; a bracket assembly comprising at least one bracket for engaging a top edge of the door, a third mounting element, and a fourth mounting element; the frame slidably mounted to the bracket assembly through slidable mating between at least the first mounting element and the third mounting element and the second mounting element and the fourth mounting element.

BRIEF DESCRIPTION OF THE DRAWINGS

FIG. 3b is a perspective view of the bracket assembly of FIG. 3a.

FIG. 4b is a front view of the mounting plate of FIG. 4a.

DETAILED DESCRIPTION OF THE INVENTION

Figure 1:
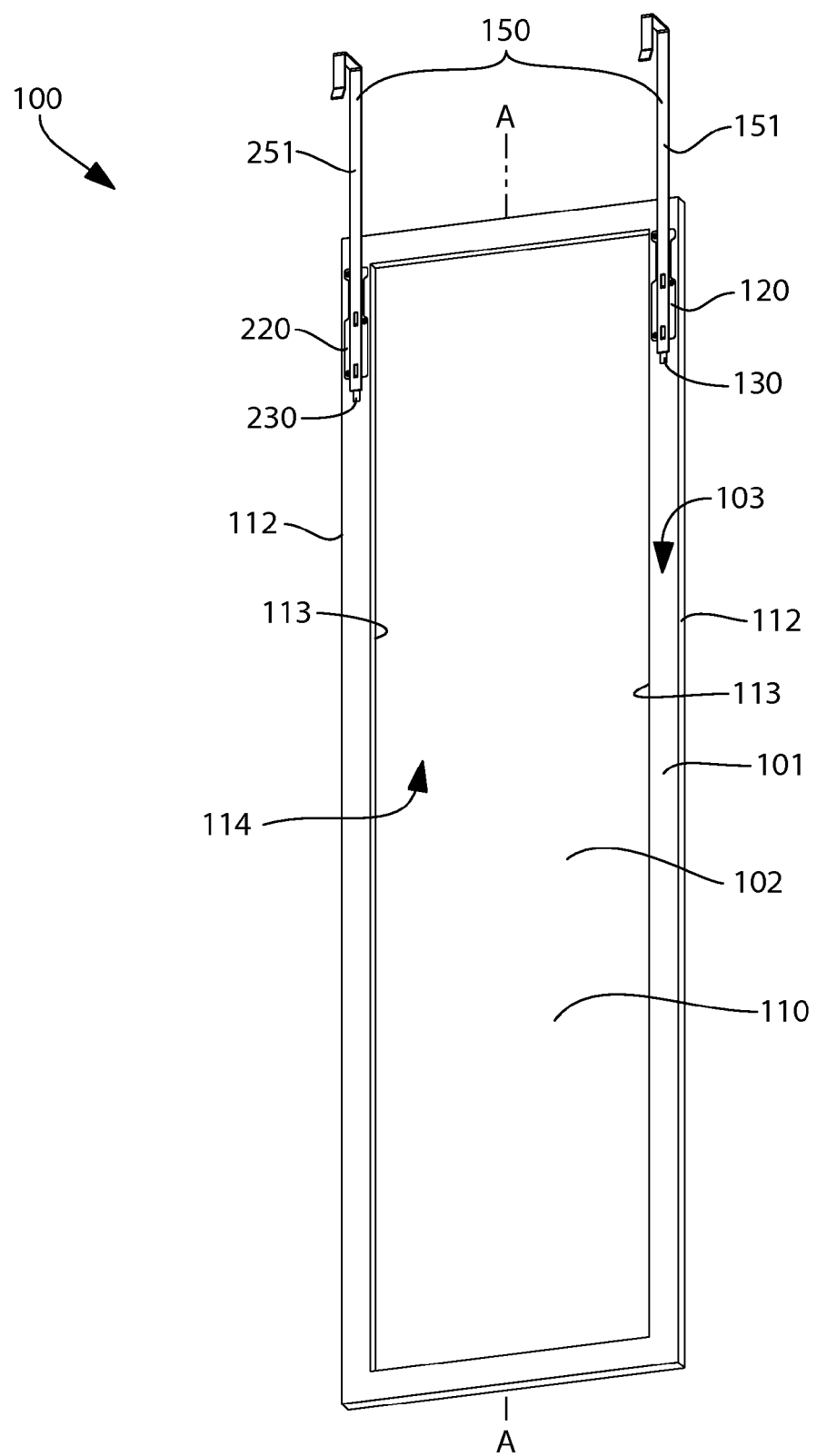
FIG. 1 is a perspective rear view of an over-the-door hanging apparatus in accordance with an embodiment of the present invention.
Figure 2:
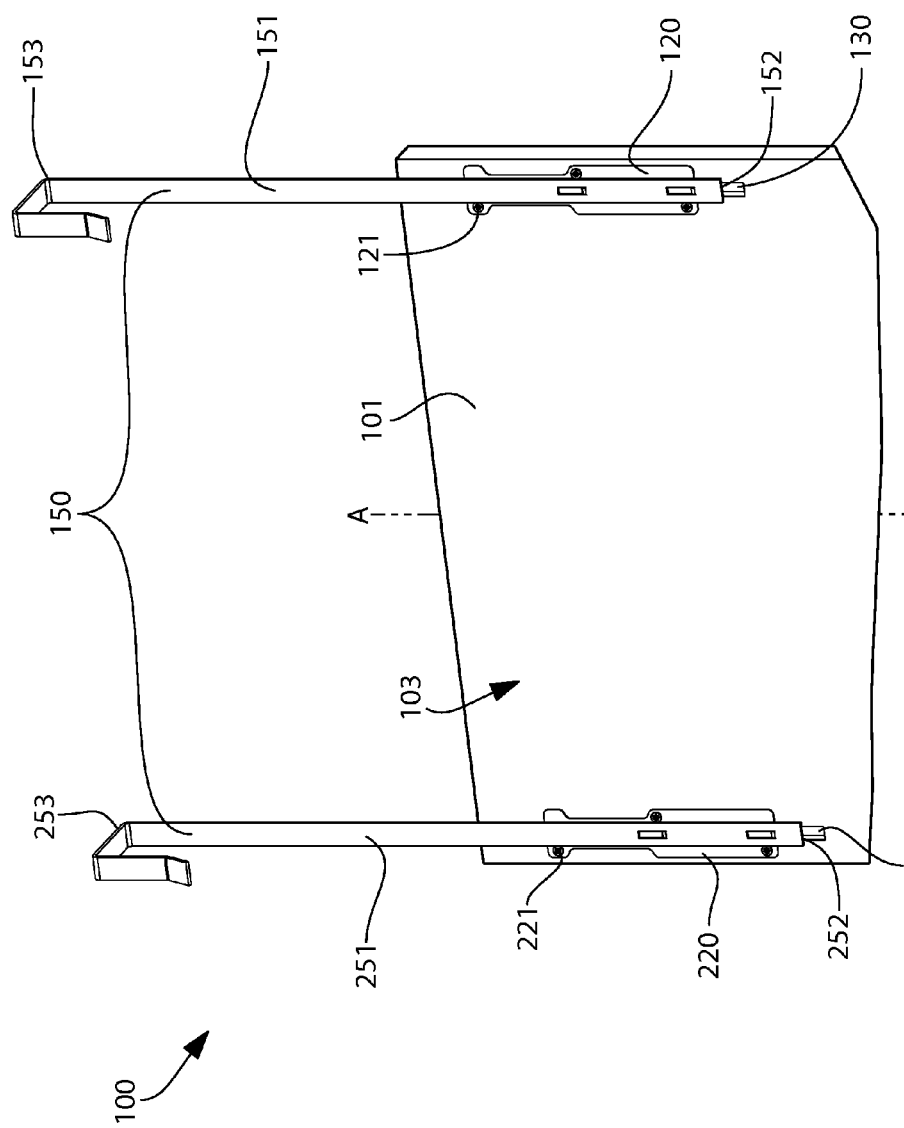
FIG. 2 is a close-up view of a top portion of the over-the-door hanging apparatus of FIG. 1.

Referring to FIGS. 1-2 concurrently, a first embodiment of an over-the-door hanging apparatus 100 is illustrated. The over-the-door hanging apparatus 100 generally comprises a frame 101, a flat article 110 supported within the frame 100, first and second mounting plates 120, 220 secured to a rear surface 103 of the frame 101, and a bracket assembly 150 to which the frame 101 is slidably mounted (as discussed in greater detail below).

In the exemplified embodiment of FIGS. 1 and 2, the frame 101 is a perimeter-type frame comprising an outer edge 112 and an inner edge 113. The inner edge 113 forms a closed-geometry thereby defining a central opening 114. A flat article 110, such as a mirror, is positioned and supported within the central opening 114 according to known mounting techniques. Although the invention will be described with reference to the flat article 110 being a mirror, any other substantially flat article (or article with a substantially flat rear surface) can be used in conjunction with the present invention, including artwork, diplomas, or the like. Furthermore, as used herein, the term "frame" is not limited to a traditional perimeter-type frame having a central opening, but includes frames resembling a simple backer-board or plate that takes up the entire (or a portion of) rear surface area of the article to be mounted thereon. Preferably, however, the desired flat article is displayed by frame 101 so as to be visible to a user when the over-the-door hanging apparatus 100 is hung from a door as described below.

The over-the-door hanging apparatus 100 comprises a first mounting plate 120 and a second mounting plate 220 that are secured to the rear surface 103 of the frame 101 on opposite lateral sides of a vertical centerline A-A. The first and second mounting plates 120, 220 are secured to the frame 101 via screws 121, 221, respectively. Of course, other fasteners and fastening techniques can be used to secure the first and second mounting plates 120, 220 to the frame, including without limitation bolts, nails, rivets, clamps, ties, slot-and-groove mating connections, snap-fit connections, and/or combinations thereof.

The over-the-door hanging apparatus 100 also comprises a bracket assembly 150 to which the frame 101 is detachably mounted. More specifically, the frame 101 is detachably mounted to the bracket assembly through a slidable mating between the first and second mounting plates 120, 220 and the hooks of the bracket assembly 150, which will be described in great detail below. The frame 101 comprises a first channel 130 and a second channel 230 (fully visible in FIG. 5). Only a bottom portion of the first and second channels 130, 230 is visible in FIGS. 1 and 2.

In the exemplified embodiment, the over-the-door hanging apparatus 100 comprises a perimeter-style frame 101, two mounting plates 120, 220 and a bracket assembly 150 that includes a first elongate bracket member 151 and a second elongate bracket member 251. In this embodiment, the two mounting plates 120, 220 are attached to the frame 101 on opposite sides of the vertical centerline A-A of the frame 101 while the first elongate member 151 is slidably attached to the first mounting plate 120 and the second elongate member 251 is slidably attached to the second mounting plate 220. Of course, the invention is not so limited and the over-the-door hanging apparatus 100 may comprise only one mounting plate and one elongate bracket member connected to a central region of the frame 101. Alternatively, the over-the-door hanging apparatus 100 may comprise greater than two mounting plates and a corresponding number of elongate members of the bracket assembly to provide for a more secure connection between the bracket assembly 150 and the frame 101. Moreover, while the first and second elongate bracket members 151, 251 are exemplified as separate structures, it is possible for theses members 151, 251 to be formed as a single construct.

For purposes of referencing direction and orientation of the various components of the over-the-door hanging apparatus 100, it should be noted that relative terms such as top, bottom, left, right, lateral, proximal, distal, upward, outward, inward, vertical, horizontal, and the like are used to delineate relative positions of the components of the inventive over-the-door hanging apparatus 100 with respect to one another and with respect to the vertical centerline A-A and are not intended to be in any further way limiting of the present invention.

Figure 3A:
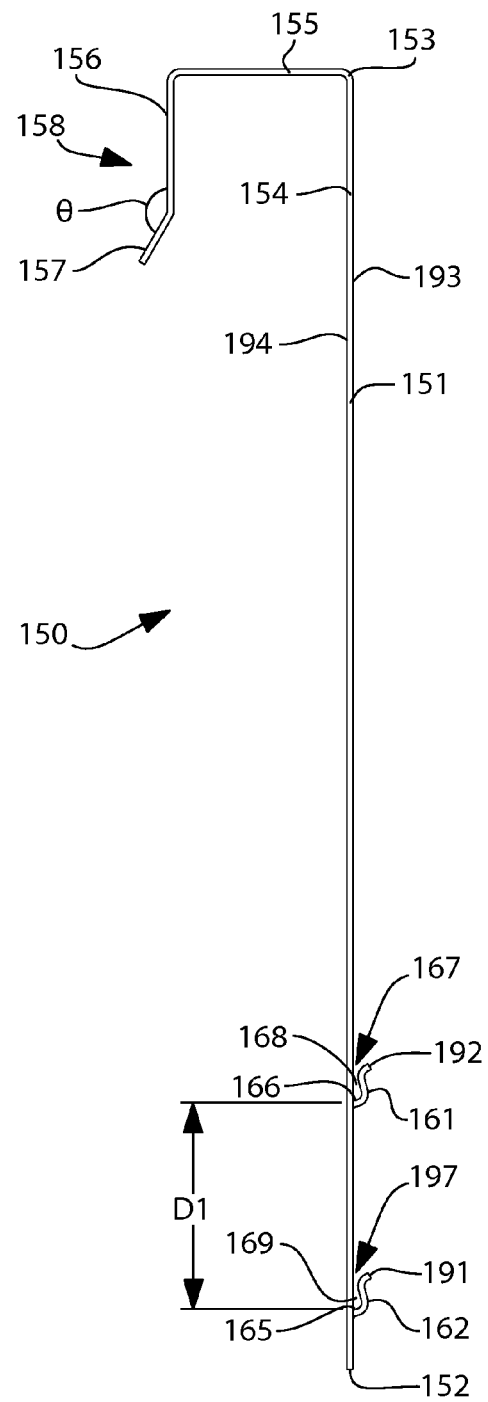
FIG. 3a is a side view of a bracket assembly in accordance with an embodiment of the present invention.
Figure 3B:
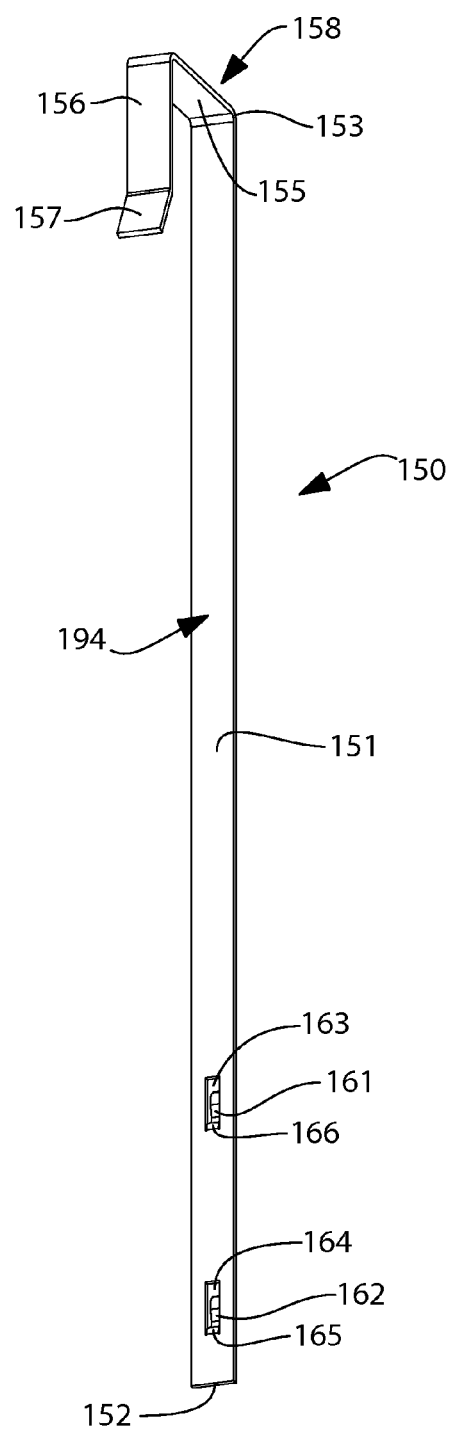

Referring now to FIGS. 2, 3a and 3b concurrently, a detailed description of the bracket assembly 150 will be set forth. The structural details of the elongate bracket members 151, 252 will be discussed herein with respect to the first elongate member 151 with the understanding that the same is applicable to the second elongate member 251 in all respects.

The first elongate member 151 extends from a distal end 152 to a proximal end 153 and comprises a front surface 193 and an opposite rear surface 194. The first elongate member 151 is preferably an integrally formed structure formed by appropriately bending a flat strip of flexible metal, such as a sheet metal. Of course, other materials and formation techniques can be used, including the molding, milling and/or lathing of plastics, matrix materials, or any other material capable of withstanding the required load-bearing requirements. Moreover, while the first elongate member 151 of the bracket assembly 150 is preferably flexible in nature, it may be constructed so as to be substantially rigid if desired.

A generally U-shaped bracket 158 is provided at a proximal end 153 of the first elongate member 151 and extends from the rear surface 194 thereof for sliding over and engaging a top edge of a door. The U-shaped bracket 158 comprises a front portion 154, a top portion 155 and a back portion 156 that terminates with an angled flange 157. The front portion 154 corresponds to a top portion of the elongate member 151 and it encompasses the proximal end 153 of the elongate member 151. The top portion 155 extends outward from the rear surface 194 of the elongate member 151 at the proximal end 153 so as to form an approximately 90 degree angle with the front portion 154 of the U-shaped bracket 158. Although the top portion 155 is described as extending at an approximately 90 degree angle from the front portion 154 of the U-shaped bracket 158, it may extend at other angles if desired. The back portion 156 of the U-shaped bracket 158 extends downwardly from the top portion 155 at an approximately 90 degree angle with the top portion 155, thereby forming the U-shaped bracket 158 of the first elongate member 151 of the bracket assembly 150. The angled flange 157 diverges slightly outward from the back portion 156 at an obtuse angle $\Theta$ in order to facilitate placement of the U-shaped bracket 158 over a top edge of a door as will be described below with reference to FIG. 8.

The U-shaped bracket 158 is preferably made of a flexible material so that it can bend and more easily fit over doors with varying widths. In other words, it is preferable that a user is able to extend the distance between the back portion 156 and the front portion 154 of the U-shaped bracket 158 by applying an outward force on the flange 157. The top portion 155 of the U-shaped bracket 158 is made wide enough to accommodate a conventional door width which the inventive bracket assembly 150 is to be used. The thickness of the material, and hence its flexibility, must be chosen so that the U-shaped bracket 158 is sufficiently rigid to avoid deformation under the load of the flat article 110 and yet is thin enough to fit over the top of the door without creating clearance problems with respect to the cap of the door frame. In use, a user may grip and pull on the flange portion 157 of the U-shaped bracket 158 of the bracket assembly 150 in order to assist with the attachment of the bracket assembly 150 to the top edge of a door as will be described in detail below with reference to FIG. 11.

The first elongate member 151 further comprises a top hook 161 and a bottom hook 162 near the distal end 152 of the elongate member 151. The top hook 161 and the bottom hook 162 collectively form a pair of hooks and are often referred to as such throughout this application. In the exemplified embodiment, the top and bottom hooks 161, 162 are integrally formed with the first member 151. More specifically, the top and bottom hooks 161, 162 are preferably formed by punching an appropriate pattern in the first elongate member 151 and subsequently bending the in-plane tab out of plane and into the desired shape. As a result, apertures 163, 164 (i.e. holes) are formed in the elongate member 151 behind the hooks 161, 162. The apertures 163, 164 enable the elongate member 151 to be manufactured with less material and also prevent the elongate member 151 from prematurely deteriorating due to the friction of the mounting plates 120, 220 against the hooks 161, 162. Of course, the apertures 163, 164 need not be included as a part of the elongate member 151 and the hooks 161, 162 can be separate structures that are subsequently welded, fastened, clamped or otherwise connected to the first elongate member 151.

The top and bottom hooks 161, 162 each extend outwardly from the front surface 193 of the elongate member 151 and upwardly toward the proximal end 153. The top hook 161 extends from a base 166 at which it connects to the elongate member 151 to a distal end 192 at which it terminates. Similarly, the bottom hook 162 extends from a base 165 at which it connects to the elongate member 151 to a distal end 191 at which it terminates. The top and bottom hooks 161, 162 are preferably in a linear vertical alignment with one another on the front surface 193 of the elongate member 151. The hooks 161, 162 each have a length which is equal to the distance from the bases 165, 166 to the distal ends 191, 192 of the hooks 161, 162, respectively. The base 166 of the top hook 161 is spaced a distance D1 from the base 165 of the bottom hook 162, the importance of which will become apparent from the description below with reference to FIGS. 4a and 4b.

The top and bottom hooks 161, 162 are preferably S-shaped tabs. The S-shape of the top and bottom hooks 161, 162 are preferred in order to accomplish an efficient attachment between the bracket assembly 150 and the mounting plates 120, 220 as will be described below. The invention, of course, is not limited by the shape of the hooks and other shapes may be used as would be known to persons skilled in the art. For example, the top and bottom hooks 161, 162 could simply be straight tabs extending outwardly in an angled fashion from the bracket assembly 150 for slidable mating with the edges of the mounting plates as described below. Furthermore, it should be understood that the term hooks is intended to include any type of tab-type structure that may extend outwardly from the bracket assembly 150 in a manner that affords slidable mating with the edges of the mounting plates 120, 220 and is not intended to be in any other way limiting of the present invention.

Both of the top and bottom hooks 161, 162 extend outwardly and upwardly from the front surface 193 of the elongate member 151 in a spaced part manner so that slots 168, 169 are formed between the hooks 161, 162 and the front surface 193 of the elongate member 151. Both of the slots 168, 169 have an open top end 167, 197 that provides access into the slots 168, 169 so that the edges of the mounting plates can be lowered into the slots 168, 169 during mounting of the frame 101 to the bracket assembly 150, which will be described in greater below with reference to FIG. 6.

Figure 4A:
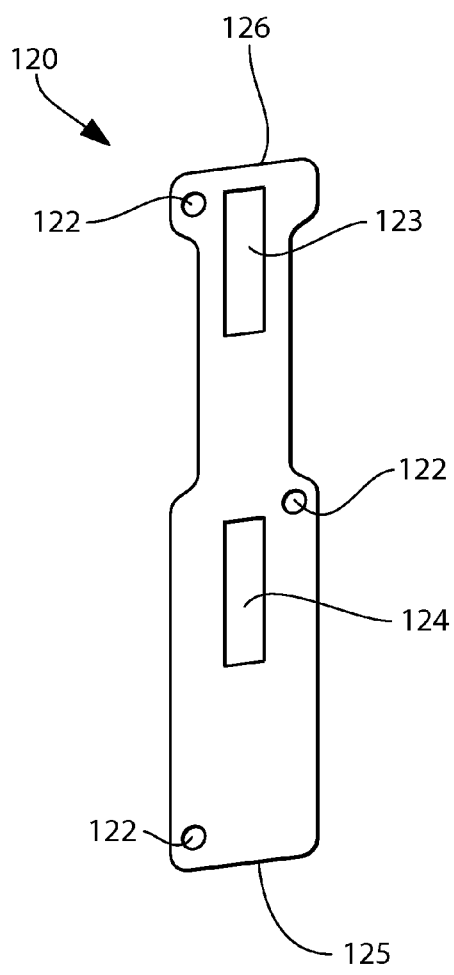
FIG. 4a is a perspective view of a mounting plate in accordance with an embodiment of the present invention.
Figure 4B:
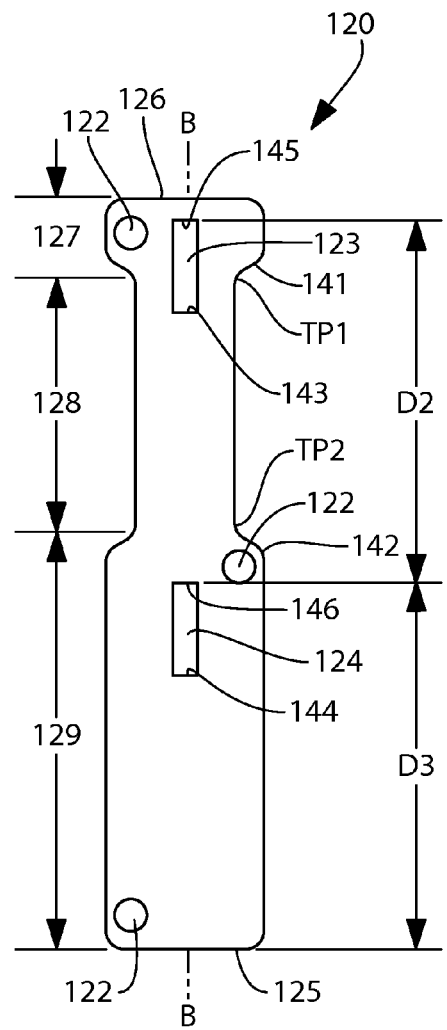

Referring now to FIGS. 4a and 4b, the details of the mounting plates 120, 220 of the present invention will be described. Similarly to the description of the elongate members 151, 251 above, only the first mounting plate 120 will be described in detail with the understanding that the discussion is applicable to the second mounting plate 220.

The first mounting plate 120 is preferably a flat plate that can be secured to the frame 101 by any of the techniques describe above. The first mounting plate 120 comprises a plurality of screw holes 122 that are sized and configured to receive a screw to facilitate the attachment of the first mounting plate 120 to the frame 101. Although the first mounting plate 120 is illustrated having three screw holes 122, the invention is not so limited and the first mounting plate 120 may have more or less than three screw holes 122 as desired. When attached to the frame 101, a rear surface (not shown) of the first mounting plate 120 is in surface contact with the rear surface 103 of the frame 101 by nature of their opposing flat surfaces.

The first mounting plate 120 is preferably a flat plate that is substantially free of contour for the entirety of its major planar surfaces. The first mounting plate 120 has an overall perimeter shape such that its cross-sectional area changes throughout its length. The first mounting plate 120 has a bottom edge 125, a top edge 126 and two vertical sides that collectively form the perimeter of the first mounting plate 120. The first mounting plate 120 also comprises a vertical axis B-B that is substantially transverse to and intersects the bottom and top edges 125, 126 of the first mounting plate 120. A top section 127 of the first mounting plate 120 extends from the top edge 126 of the first mounting plate 120 to a transition point TP1. A middle section 128 of the first mounting plate 120 extends from the transition point TP1 to a transition point TP2. A bottom section 129 of the first mounting plate 120 extends from the transition point TP2 to the bottom end 125 of the first mounting plate 120. The cross-sectional area of the top section 127 of the first mounting plate 120 gradually decreases from a point 141 in the top section 127 to the transition point TP1. The middle section 128 of the first mounting plate 120, which extends from the transition point TP1 to the transition point TP2, has a constant cross-sectional area throughout its length. The cross-sectional area of the bottom section 129 of the first mounting plate 120 gradually increases from the transition point TP2 to a point 142. The cross-sectional area of the first mounting plate 120 is again constant from the point 142 of the bottom section 129 of the first mounting plate 120 to the bottom edge 125 of the first mounting plate 120. The shape of the first mounting plate 120 provides the first mounting plate 120 with a structural rigidity while using a minimized amount of materials in order to reduce the costs in manufacturing.

In the illustrated embodiment, the first mounting plate 120 comprises a top aperture 123 and a bottom aperture 124. The top aperture 123 is positioned partially within both of the top and middle sections 127, 128 while the bottom aperture 124 is positioned within the bottom section 129 only. Although the invention is described with a plate having two apertures, the first mounting plate 120 may have only one aperture or more than two apertures as would be understood by a person skilled in the art. Furthermore, the apertures 123, 124 may be positioned on other locations on the first mounting plate 120 as desired. Using more apertures will enable additional adjustability to the hanging height of the article as will be described below. The apertures 123, 124 in the first mounting plate 120 are preferably rectangular in shape, but may take on any other shape as desired.

The top aperture 123 is defined by a closed-geometry edge that includes a top edge 145 and a bottom edge 143. Similarly, the bottom aperture 124 is defined by a closed-geometry edge that includes a top edge 146 and a bottom edge 144. The top edge 145 of the top aperture 123 is spaced a distance D2 from the top edge 146 of the bottom aperture 124, measured along the linear axis B-B. Similarly, the top edge 146 of the bottom aperture 124 is spaced a distance D3 from the bottom edge 125, measured along the axis B-B. The first mounting plate 120 is designed so that the distance D2 is substantially equal to the distance D3. Furthermore, both of these distances D2, D3 are also substantially equal to the distance D1 between the hooks 161, 162 (discussed above with respect to FIGS. 3a, 3b). The importance of the edges 145, 146, 125, and the distances D1, D2, D3 will become apparent from the description below with reference to FIG. 5.

Figure 5:
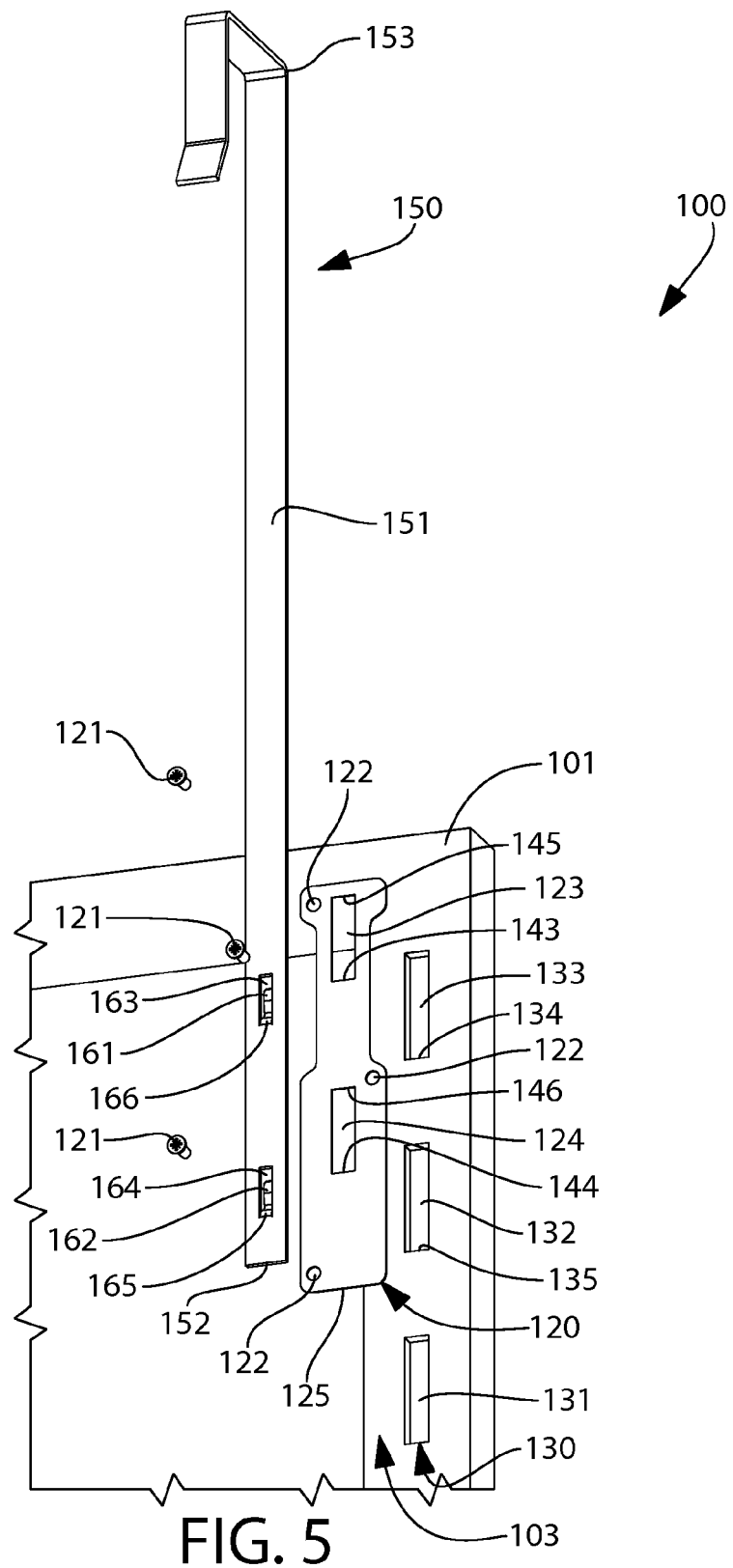
FIG. 5 is an exploded view of one lateral side of the over-the-door hanging apparatus of FIG. 1.

Referring now to FIG. 5, a portion of the over-the-door hanging apparatus 100 is illustrated in an exploded state. As can be seen, the frame 101 comprises has a first channel 130 formed into the rear surface 103 on one side of the vertical centerline A-A of the frame 101 along the right lateral (another one of the channels is provided on the opposite side of the vertical centerline A-A). In the exemplified embodiment of FIG. 5, the channel 130 is illustrated as a segmented channel 130 comprising a first channel segment 131, a second channel segment 132 and a third channel segment 133.

As noted above, FIG. 5 illustrates the channel 130 as comprising a first channel segment 131, a second channel segment 132 and a third channel segment 133. However, more than three channel segments may be used as desired for further adjustability in the hanging height of the over-the-door hanging apparatus 100 as will be described below. Furthermore, the frame 101 may be configured with less than three channel segments and still be used as described below as would be understood by a person skilled in the art.

Each of the channel segments 131-133 of the channel 130 is a rectangular shaped depression formed into the frame 101. The channel segments 131-133 of the channel 130 each form a groove or trough within the rear surface 103 of the frame 101 that comprises a floor and, thus, do not extend through the entire thickness of the frame 101. However, in alternative embodiments, one or more of the channel segments 131-133 of the channel 130 may be through-holes in the sense that they could extend all the way through the thickness of the frame 101. Of course, the channel segments 131-133 are contemplated as taking on any other shapes, including without limitation circles, triangles, trapezoids or the like.

Figure 7:
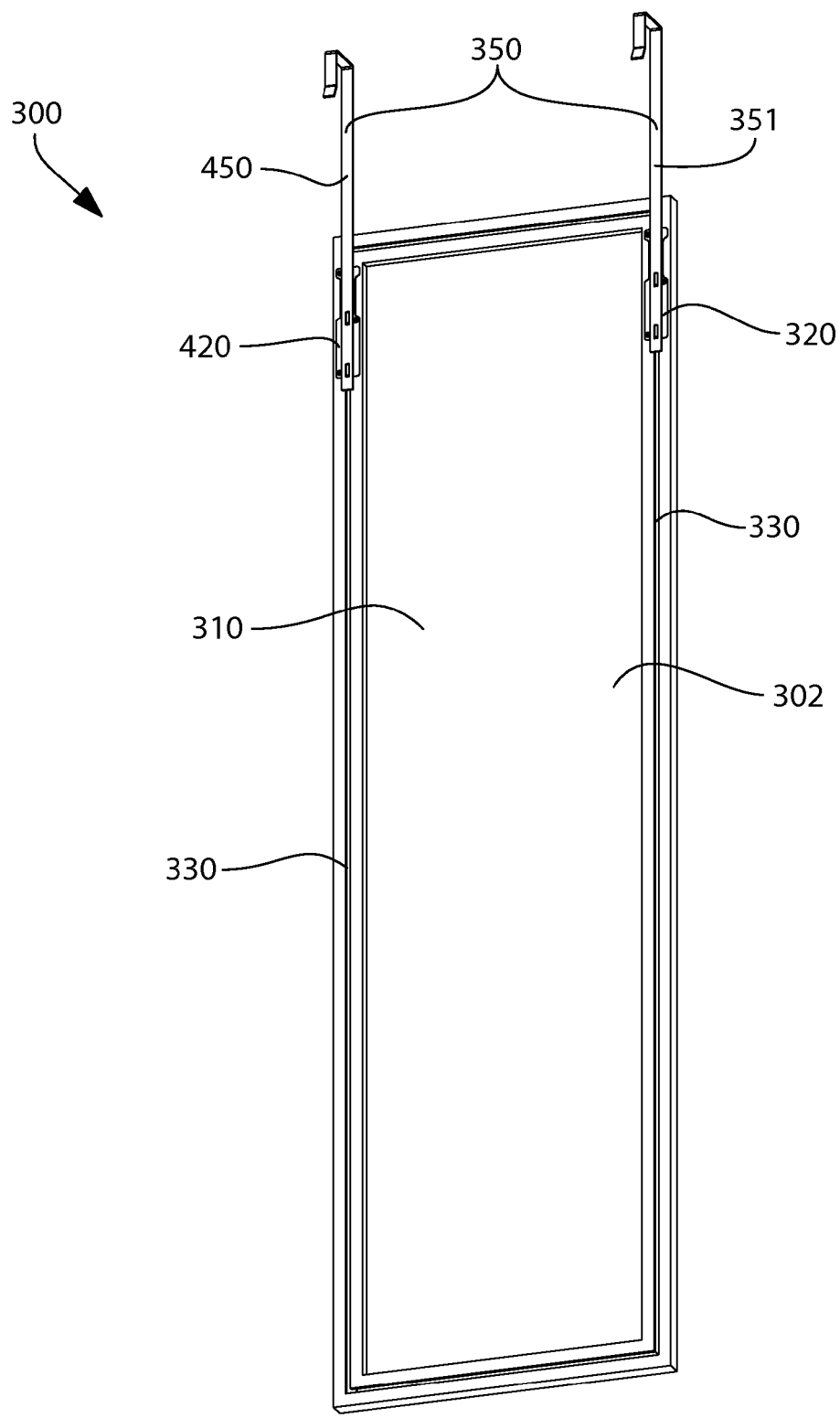
FIG. 7 is a perspective rear view of an over-the-door hanging apparatus in accordance with a second embodiment of the present invention wherein an annular channel is formed into the frame to receive the hooks of the bracket assembly.
Figure 8:
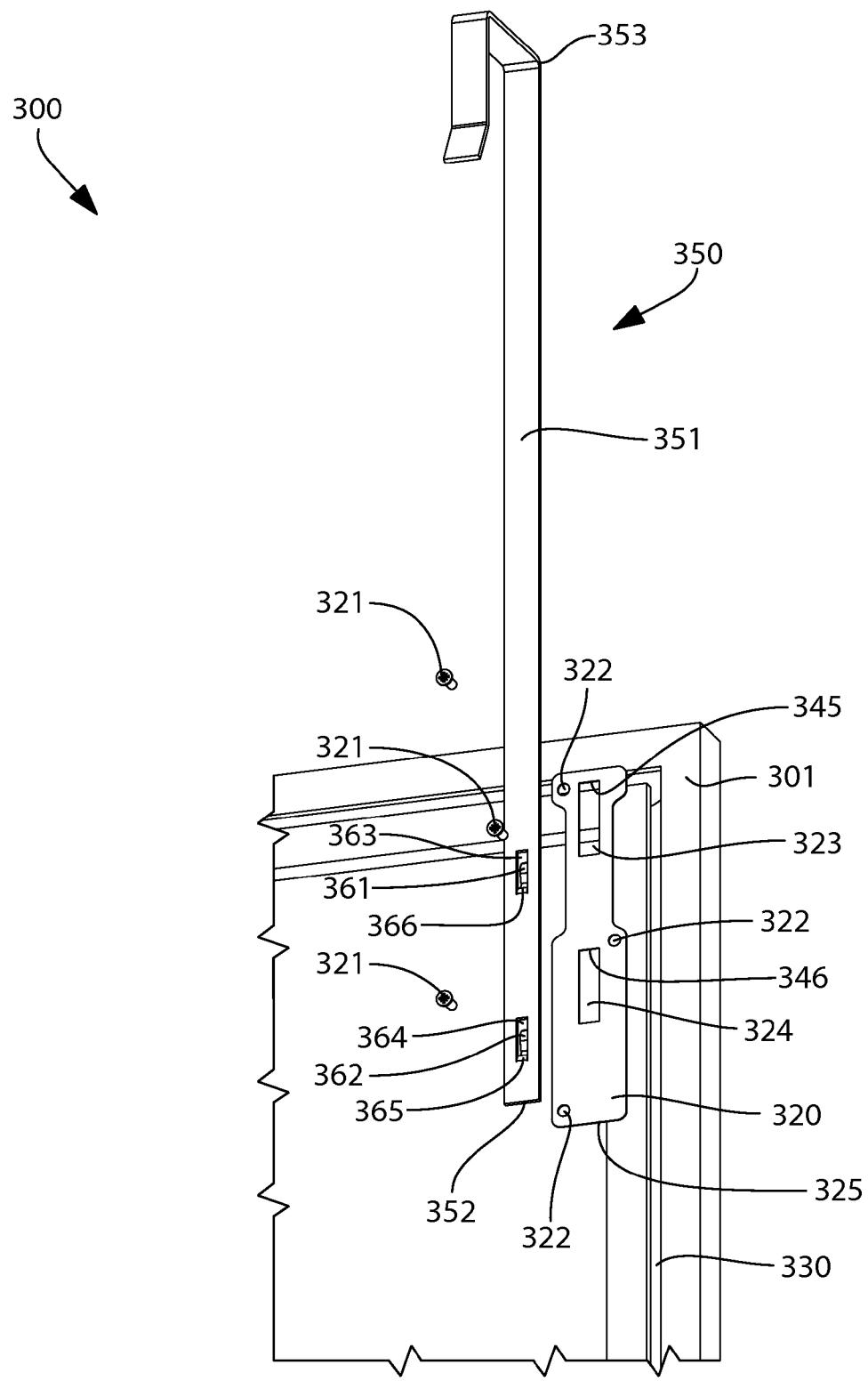
FIG. 8 is an exploded view of the components of one lateral side of the over-the-door hanging apparatus of FIG. 7.
Figure 9:
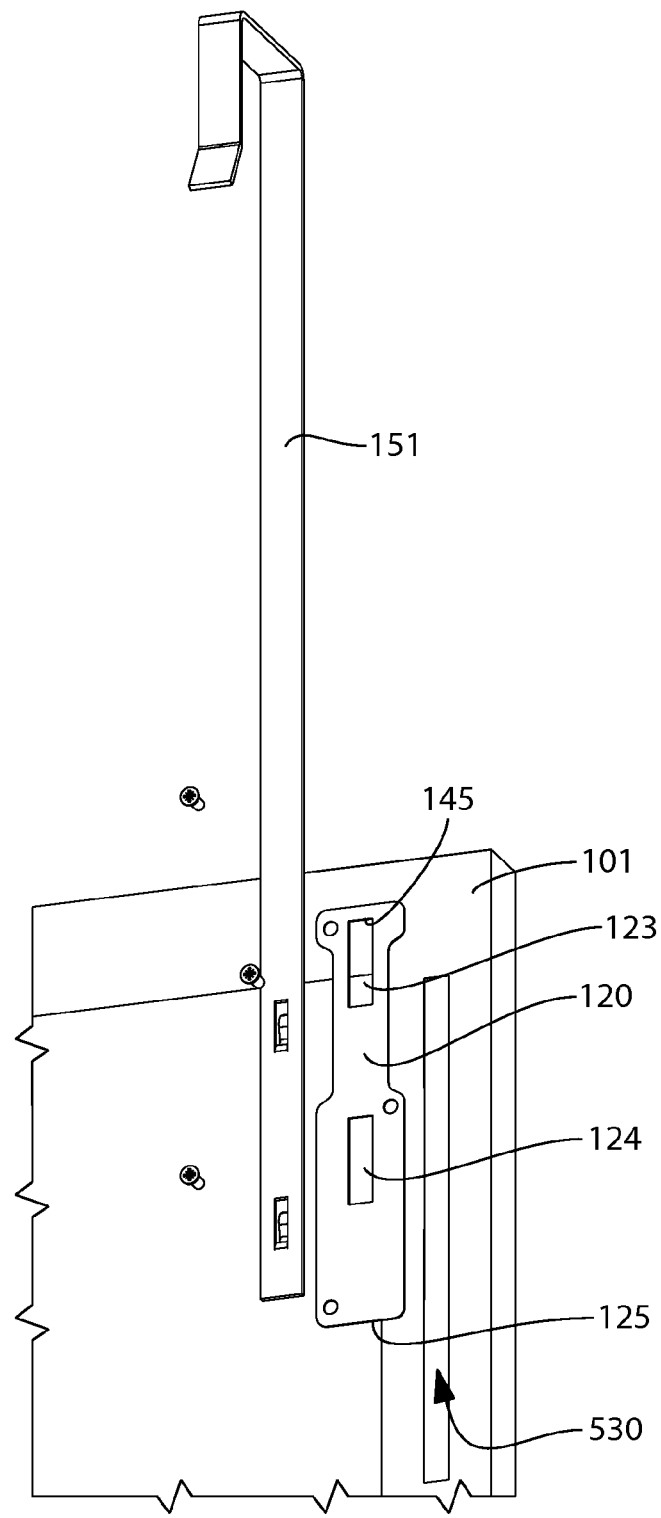
FIG. 9 is an exploded view of the components of one lateral side of an over-the-door hanging apparatus in accordance with a third embodiment of the present invention wherein a single continuous channel is provided on each vertical member of the frame to receive the hooks of one member of the bracket assembly.

Furthermore, while the channel 130 is exemplified as a segmented channel, the invention is not so limited and the channel 130 may be a singular continuous annular channel that extends around the entire perimeter of the rear surface 103 of the frame 101 or can be a continuous channel that extends from below the bottom edge 125 of the first mounting plate 120 to above the top edge 145 of the top aperture 123 of the first mounting plate 120. These alternative embodiments are shown in FIGS. 7-9 and will be described in greater detail below.

Figure 6:
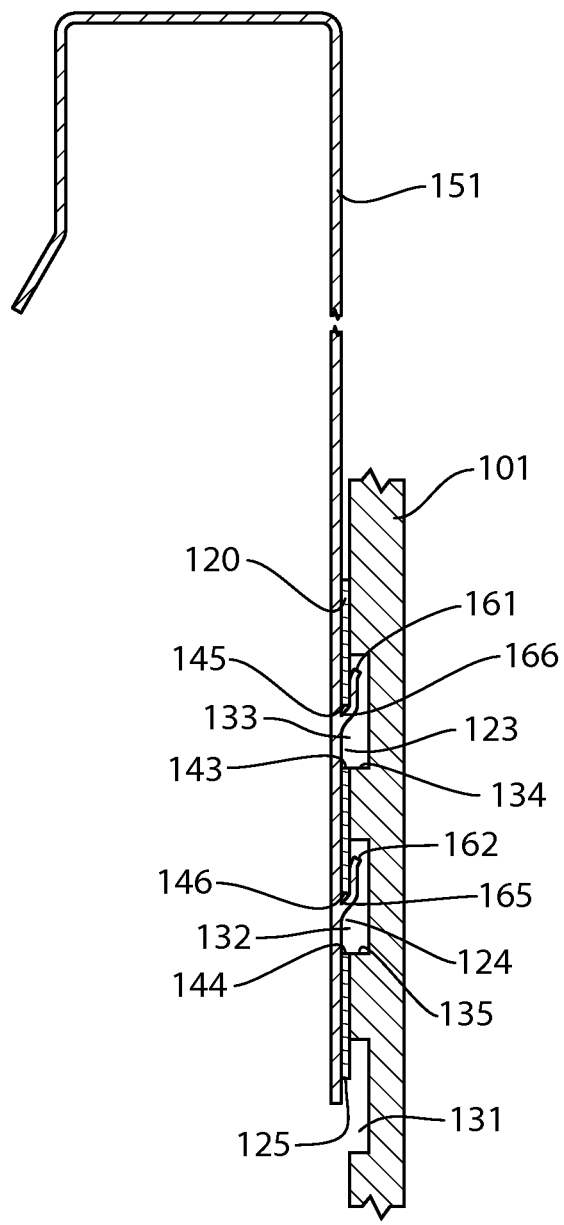
FIG. 6 is a cross-sectional schematic of the over-the-door hanging apparatus showing the connection between the bracket assembly and the mounting plate.

Referring to FIGS. 5 and 6 concurrently, the placement and attachment of the first mounting plate 120 to the rear surface 103 of the frame 101 will be described. In FIGS. 5 and 6, only the first mounting plate 120 is shown for clarity and ease of understanding. However, it is to be understood that the second mounting plate 220 is attached to the rear surface 103 of the frame 101 in the same manner as the first mounting plate 120, except that the second mounting plate 220 is attached to the opposite side of the vertical centerline A-A of the frame 101 (FIG. 2) in cooperation with a second channel.

The first mounting plate 120 is secured to the rear surface 103 of the frame 101 so that the vertical axis B-B of the first mounting plate 120 is coextensive with the elongated channel 130, which in the exemplified embodiment is substantially parallel with the vertical centerline A-A. The second mounting plate 220 is secured to the rear surface 103 of the frame 101 on the opposite side of a vertical centerline A-A of the frame 101 in an identical orientation with respect to the second channel 230.

More specifically, the first mounting plate 120 is secured to the frame 101 so that: (1) the first channel segment 131 extends from a position below the bottom edge 125 of the first mounting plate 120 to a position above the bottom edge 125 of the first mounting plate 120; (2) the second channel segment 132 extends from a position below the top edge 146 of the bottom aperture 124 of the first mounting plate 120 to a position above the top edge 146 of the bottom aperture 124 of the first mounting plate 120; and (3) the third channel segment 133 extends from a position below the top edge 145 of the top aperture 123 of the first mounting plate 120 to a position above the top edge 145 of the top aperture 124 of the first mounting plate 120. While not required, it may be preferred that the first mounting plate 120 be secured to the frame 101 so that further: (1) the bottom edge 144 of the bottom aperture 124 is aligned with the top edge 146 of the bottom aperture 124 of the first mounting plate 120; and (2) the bottom edge 143 of the top aperture 123 of the first mounting plate 120 is aligned with the top edge 145 of the top aperture 123 of the first mounting plate 120.

When the first mounting plate 120 is secured to the frame 101 in the manner described above, the top aperture 123 is aligned with the first channel segment 133 and forms a passageway through the first mounting plate 120 into the third channel segment 133. Similarly, the bottom aperture 124 is aligned with the second channel segment 132 and forms a passageway through the first mounting plate 120 into the second channel segment 132. Moreover, the top edge 145 of the top aperture 123 extends transversely across the third channel segment 133. The top edge 146 of the bottom aperture 124 extends transversely across the second channel segment 132. The bottom edge 125 of the first mounting plate 120 extends transversely across the first channel segment 131.

Referring solely now to FIG. 6, the first, second and third channel segments 131-133 preferably extend above the bottom edge 125 of the first mounting plate 120, the top edge 146 of the bottom aperture 124, and the top edge 145 of the top aperture 123, respectively, by a distance that is at least equal to the length of the hooks 161, 162. This configuration provides sufficient space for the hooks 161, 162 to fit within the selected channel segments 131-133 when the frame 101 is slidably mounted to the bracket assembly 150 as will be discussed below.

Referring to FIGS. 2, 5 and 6 concurrently, the attachment of the bracket assembly 150 to the first and second mounting plates 120, 220 will be described. The description will be provided with specific reference to the mating between the first mounting plate 120 and the first elongate member 151 of the bracket assembly 150. However, it should be understood that the description is equally applicable to the mating of the second mounting plate 220 with the second elongate member 251.

After properly aligning the first mounting plate 120 as described above, the first mounting plate 120 is secured to the rear surface 103 of the frame 101 by extending the screws 121 through the screw holes 122 and threadily engaging the frame. It is preferred that the first and second mounting plates 120, 220 be preassembled (i.e., secured) to the frame 101 during manufacturing. Thus, the user will be able to hang the apparatus 100 to a door without the need for any tools or excessive physical strength. In other words, the user will purchase the product fully assembled with the exception that the bracket assembly 150 will be separate from the first and second mounting plates 120, 220 and frame 101. As such, the user will only need to slide the U-Shaped brackets of the bracket assembly 150 over the top edge of the door and then slide the hooks 161, 162 of the bracket assembly into mating cooperation with either: (1) the top edges 145, 146 of the apertures 123, 124; or (2) the top edge 146 and the bottom edge 125.

By nature of having an option between sliding the hooks 161, 162 of the bracket assembly into mating cooperation with either: (1) the top edges 145, 146 of the apertures 123, 124; or (2) the top edge 146 and the bottom edge 125, the inventive over-the-door hanging apparatus 100 has an advantageous built-in hanging height adjustability. In other words, depending upon which of the channel segments 131-133 of the frame 101 the top and bottom hooks 161, 162 are attached to, the hanging height may be altered. A more detailed description of how the inventive over-the-door hanging apparatus 100 may be hung at a lower and/or a higher position will be set forth below. It should be understood, however, that while the description will be set forth below in relation to the first elongate member 151 mating with the first mounting plate 120 and the first channel 130, the same principles apply to the mating between the second elongate member 151, the second mounting plate 220, and the second channel 230.

When a lower hanging position is desired, such as is shown in FIG. 6, the first elongate member 151 of the bracket assembly 150 will be attached to the frame 101 by inserting the bottom hook 162 through the bottom aperture 124 in the first mounting plate 120 and the top hook 161 through the top aperture 123 in the first mounting plate 120. Because the first mounting plate 120 is attached to the frame 101 so that the bottom aperture 124 is aligned with the second channel segment 132 and the top aperture 123 is aligned with the third channel segment 133, the bottom hook 162 will be inserted into the second channel segment 132 of the frame 101 while the top hook 161 will be inserted into the third channel segment 133 of the frame 101. Once sufficiently inserted through the apertures 123, 124 and into the second and third channel segments 132, 133 of the frame 101, the frame 101 will be lowered (or the elongate member 151 will be raised) until the top edge 145 of the top aperture 123 of the first mounting plate 120 slides into the slot 168 of the top hook 161 and the top edge 146 of the bottom aperture 124 of the first mounting plate 120 slides into the slot 169 of the bottom hook 162. When fully slid into the slots 168, 169, the base 165 of the bottom hook 162 will contact the top edge 146 of the bottom aperture 124 of the first mounting plate 120 and the base 166 of the top hook 161 will contact the top edge 145 of the top aperture 123 of the first mounting plate 120.

As noted above, the second and third channel segments 132, 133 extend upwardly beyond the edges 145, 146 (in the direction of the vertical axis A-A) and beneath the first mounting plate 120. This configuration enables the hooks 161, 162 of the bracket assembly 150 to extend into the frame 101 so that a portion of the first mounting plate 120 is snugly disposed within each of the slots 168, 169.

Through this slidable mating, the hooks 161, 162 frictionally engage the portions of the first mounting plate 120 positioned within the slots 168, 169 to prevent the frame 101 from becoming accidentally dislodged from the bracket assembly 150. The frictional engagement is further facilitated by the S-shape and resilient nature of the hooks 161, 162. Although the attachment is described as being a friction fit, the invention is not so limited and the attachment may be described as a press fit, an interference fit or any other fit as would be known to persons skilled in the art. The attachment between the bracket assembly 150 and the frame 101 will be enhanced when the U-shaped bracket 158 of the bracket assembly 150 is attached to a top edge of a door because the weight of the flat article 110 being hung will increase the tight nature of the fit between the hooks 161, 162 and the combined plate/frame 120/101 apparatus.

The invention has been described with the bracket assembly 150 attached to the second and third channel segments 133, 132 in the frame 101. Such an attachment is used when the hanging height of the mirror or article is desired to be a lower hanging height. As noted above, the hanging height of the over-the-door hanging apparatus 100 is adjustable. Therefore, the mirror or other flat article 110 may be hung at a higher hanging height in the manner described below and as shown in FIG. 2.

When the first mounting plate 120 is secured to the frame 101, the first channel segment 131 in the frame 101 extends beyond the bottom edge 125 of the first mounting plate 120 as illustrated in FIG. 2. Therefore, rather than attaching the bracket assembly 150 through the second and third channel segments 133, 132 of the frame 101, the hooks 161, 162 of the bracket assembly 150 are attached to the second and first channel segments 132, 131 of the frame 101, respectively. Specifically, the bottom hook 162 will be inserted into the first channel segment 131 below the bottom edge 125 of the first mounting plate 120 while the top hook 161 will be inserted into the second channel segment 132 via the bottom aperture 124 of the first mounting.

Once sufficiently inserted into the first and second channel segments 131, 132 of the frame 101, the frame 101 will be lowered (or the elongate member 151 will be raised) until the top edge 146 of the bottom aperture 124 of the first mounting plate 120 slides into the slot 168 of the top hook 161 and the bottom edge 146 of the first mounting plate 120 slides into the slot 169 of the bottom hook 162. When fully slid into the slots 168, 169, the base 165 of the bottom hook 162 will contact the top edge 146 of the bottom aperture 124 of the first mounting plate 120 and the base 166 of the top hook 161 will contact the bottom edge 125 of the first mounting plate 120.

As noted above, the first and second channel segments 131, 132 extend upwardly beyond the edges 146, 125 (in the direction of the vertical axis A-A) and beneath the first mounting plate 120. This configuration enables the hooks 161, 162 of the bracket assembly 150 to extend into the frame 101 so that a portion of the first mounting plate 120 is snugly disposed within each of the slots 168, 169. Thus, the same frictional/interference fit is formed. With such an attachment, the apparatus 100 may be hung at a higher level on a door than previously described manner. Thus, the present invention provides an easy and efficient way for a user to adjust the hanging height of a mirror or other object without the need for tools or an excessive amount of physical force. The adjustable height mounting is achieved by designing the distances D1, D2, D3 to be substantially equal.

Of course, the second elongate member 251 may be attached in the same manner as described above except that the second elongate member 251 is attached to the second mounting plate 220 which is secured onto the frame 101 on the opposite side of the vertical centerline A-A. By using the first and second elongate members 151, 251, the flat article 110 will be more securely hung from the top of the door.

Referring to FIGS. 7 and 8 concurrently, an alternative embodiment of a frame 301 to be used with an over-the-door hanging apparatus 300 will be described. The components of the over-the-door hanging apparatus 300 that are the same as the components described above with reference to the over-the-door hanging apparatus 100 will be delineated by the same reference numerals except that the over-the-door hanging apparatus 300 will use the 300- and 400-series of numbers rather than the 100- and 200-series of numbers. Furthermore, only those aspects of the over-the-door hanging apparatus 300 that are different from the over-the-door hanging apparatus 100 described above will be described below in detail. Therefore, all features of the over-the-door hanging apparatus 300 that are not described below should be interpreted as being identical to the corresponding component from the over-the-door hanging apparatus 100 described above.

Specifically, rather than having a channel 130 comprising three distinct channel segments 131-133 in the frame 101 that require time and effort in order to properly align the first and second mounting plates 120, 220 as described above, the frame 301 may have a continuous channel 330 along all four sides of the frame 301 so as to form an annular channel about the perimeter of the frame 301. This embodiment is advantageous in that it reduces the costs in manufacturing by reducing the amount of material needed to create the frame 301 and by reducing the time required to attach the first and second mounting plates 320, 420 to the frame 301.

In use, the first mounting plate 320 is aligned with the channel 330 so that the channel 330 can be seen through the apertures 323, 324 in the first mounting plate 320. This embodiment nullifies the need to align the apertures 323, 324 of the first mounting plate 320 with the channel 330 in a vertical direction and instead enables the first mounting plate 320 to be attached to the frame 301 in a myriad of positions so long as the channel 330 is visible and accessible through the apertures 323, 324. Such an embodiment provides a significantly greater amount of flexibility to the hanging height of the flat article.

After the first mounting plate 320 (and preferably also the second mounting plate 420) is secured to the frame, the hooks 361, 362 of the bracket assembly 350 are inserted through the apertures 323, 324 of the first mounting plate 320 in the same manner as described above. The entire attachment procedure between the bracket assembly 350 and the frame 301 is identical to the attachment procedure described above with reference to the bracket assembly 150 and the frame 101. Essentially, the over-the-door hanging apparatus 300 is identical to the over-the-door hanging apparatus 100 except that instead of having a segmented channel 130 in the frame 101, there is one continuous channel 330 in the frame 301 that forms a rectangular border around the entirety of the frame 301. As can be seen the channel 330 still extends from a position below to a position above each of the edges 345, 346, 325.

Referring to FIG. 9, another alternative embodiment of the channel in the frame will be described. This embodiment comprises a continuous channel 530 that is not segmented and that does not form a border around the frame 101. Rather, the channel 530 only extends from a position below the bottom edge 147 of the first mounting plate 120 to a position above the top edge 145 of the top aperture 123 of the first mounting plate 120. In such an embodiment, a second channel (not shown) which is identical to the channel 530 will be located on the opposite lateral side of the frame 101, thereby forming a mirror image.

Figure 10:
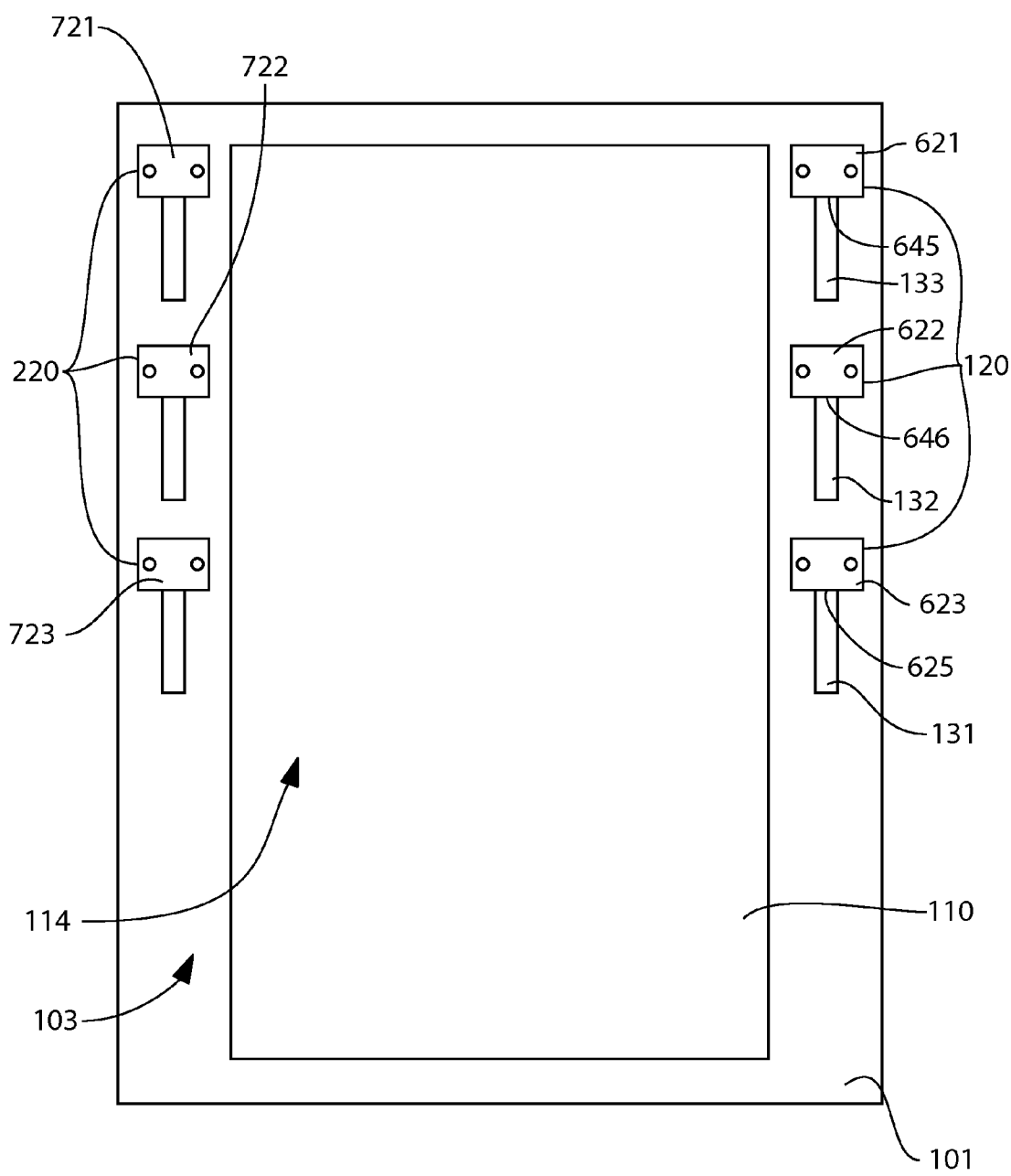
FIG. 10 is a rear view of an over-the-door hanging apparatus in accordance with a fourth embodiment of the present invention wherein multiple mounting plate segments are used to mate with the hooks of one member of the bracket assembly.

Referring to FIG. 10, an alternative embodiment for a mounting plate will be described. The first and second mounting plates 120, 220 may each comprise a first plate segment 621, 721, a second plate segment 622, 722 and a third plate segment 623, 723. This embodiment will be further described only with reference to the first mounting plate 120. It should be understood that the second mounting plate 220 will have features and components that are identical to the first mounting plate 120.

In the embodiment illustrated in FIG. 10, a bottom edge 625 of the third plate segment 623 serves an identical purpose to the bottom edge 125 of the first mounting plate 120 described above. Furthermore, a bottom edge 646 of the second plate segment 622 serves an identical purpose to the top edge 146 of the bottom aperture 124 of the first mounting plate 120. Further still, a bottom edge 645 of the first plate segment 621 serves an identical purpose to the top edge 145 of the top aperture 123 of the first mounting plate 120. It should be understood to a person skilled in that art that the inventive over-the-door hanging apparatus 100 would operate in the same exact manner with the three plate segment 621, 622, 623 embodiment as it would with the mounting plate 120 as described above. In other words, the bracket assembly 150 will be attached to the embodiment illustrated in FIG. 10 in the same manner as was described above.

Figure 11:
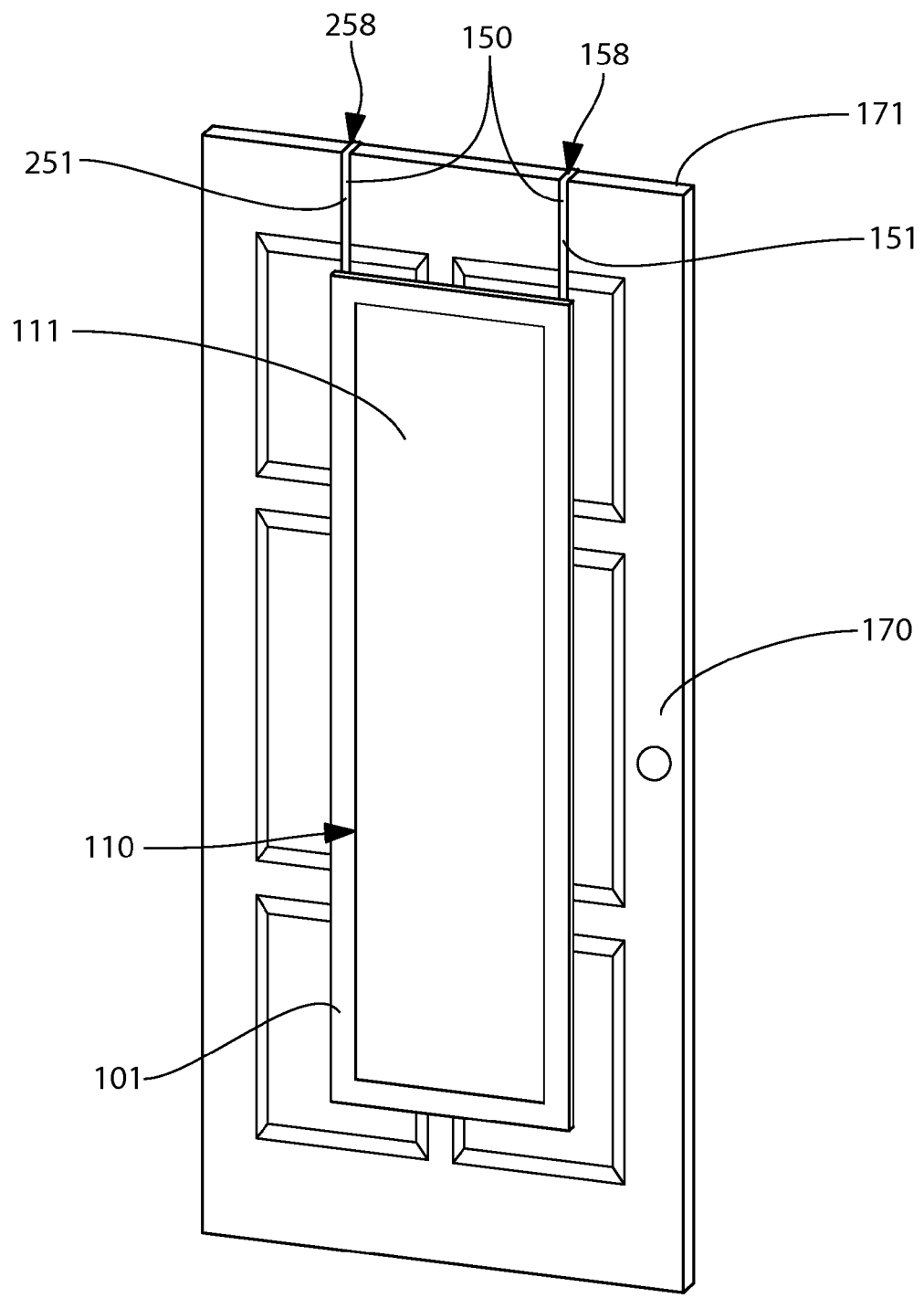
FIG. 11 is a perspective view of an over-the-door hanging apparatus of FIG. 1 hanging from the top edge of a door in accordance with the present invention.

Referring to FIG. 11, the mirror 110 or other article is illustrated hanging from a top edge 171 of a door 170. In the illustrated embodiment, the mirror or other flat article 110 is attached to the bracket assembly 150 which comprises the first elongate member 151 and the second elongate member 251 on opposite lateral sides of the rear surface (not shown) of the flat article 110. The U-shaped brackets 158, 258 of the elongate members 151, 251 of the bracket assembly 150 are attached to the top edge 171 of the door 170 so that the flat article 110 is hung therefrom. When the flat article 110 is a mirror, it is hung so that the reflective front surface 111 is visible and the rear surface (not shown) is in surface contact with the door 170. It should be understood that any of the various types of channels and mounting plates may be used with the inventive over-the-door hanging apparatus in many different combinations. For example, the three plate segment 621, 622, 623 mounting plate may be used with the segmented channels 131, 132, 133 or with the elongated channel 530 or with the border/annular channel 330. Similarly, the first and second mounting plates 120, 220 may also be used with any of the above mentioned channel configurations.

In alternative embodiments of the invention, which are not illustrated, the frame 100 may not include channels 130, 230 in its rear surface 101. In such embodiments, the first and second mounting plates 120, 220 (or the segments thereof) would be placed over planar sections of the rear surface 101 of the frame 100 and be designed so that the hooks 161-162, 191-292 could be slid/inserted between a raised portion of the mounting plates 120, 220 and the planar sections of the rear surface 101. This could be accomplished by forming the first, second and/or third edges 125, 145, 146 to include a raised portion that protrudes from the rear surface 101 of the frame 100, thereby forming a nesting space/gap between the rear surface 101 of the frame 100 and the rear surfaces of the mounting plates 120, 220 (or the segments thereof). For example, the mounting plates 120, 220 (or the segments thereof) could be formed in to resemble one half of a C-clamp and/or a V-clamp. In another example, a small section of the first, second and/or third edges 125, 145, 146 could be bent out of plane with the remaining sections of the mounting plates 120, 220 (or the segments thereof) that are coupled to the frame 100. Finally, any of the foregoing details described above with respect to FIGS. 1-11 could be utilized with such an alternative embodiment.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An over-the-door hanging apparatus comprising:
    a frame comprising an outer edge, an inner edge defining a central opening, and a rear surface;
    a mirror positioned within the central opening of the frame;
    a first mounting plate and a second mounting plate, the first and second mounting plates secured to the rear surface of the frame on opposite sides of a vertical centerline of the frame, the first mounting plate comprising a first mounting element, the second mounting plate comprising a first mounting element;
    a first elongate member comprising a first mounting element and a first bracket for slidably engaging a top edge of a door;
    a second elongate member comprising a first mounting element and a second bracket for slidably engaging the top edge of the door;
    the frame slidably mounted to the first elongate member through slidable mating between at least the first mounting element of the first mounting plate and the first mounting, element of the first elongate member;
    the frame slidably mounted to the second elongate member through slidable mating between at least the first mounting element of the second mounting plate and the first mounting element of the second elongate member;
    wherein the first mounting element of the first elongate member comprises a first hook and the first mounting element of the second elongate member comprises a first hook; and
    wherein the first mounting element of the first mounting plate comprises a raised portion that protrudes from the rear surface of the frame, the first hook of the first elongate member slidably inserted between the raised portion of the first mounting plate and the frame; and wherein the first mounting element of the second mounting plate comprises a raised portion that protrudes from the rear surface of the frame, the first hook of the second elongate member slidably inserted between the raised portion of the second mounting plate and the frame.

2. The over-the-door hanging apparatus according to claim 1 wherein the first mounting element of the first mounting plate comprises a first edge, the first edge of the first mounting plate located within a slot of the first hook of the first elongate member; and wherein the first mounting element of the second mounting plate comprises a first edge, the first edge of the second mounting plate located within a slot of the first hook of the second elongate member.

3. An over-the-door hanging apparatus comprising:
a frame comprising an outer edge, an inner edge defining, a central opening, and a rear surface;
a mirror positioned within the central opening of the frame;
a first mounting plate and a second mounting plate, the first and second mounting plates secured to the rear surface of the frame on opposite sides of a vertical centerline of the frame, the first mounting plate comprising a first mounting element, the second mounting plate comprising a first mounting element;
a first elongate member comprising a first mounting element and a first bracket for slidably engaging a top edge of a door;
a second elongate member comprising a first mounting element and a second bracket for slidably engaging the top edge of the door;
the frame slidably mounted to the first elongate member through slidable mating between at least the first mounting element of the first mounting plate and the first mounting element of the first elongate member;
the frame slidably mounted to the second elongate member through slidable mating between at least the first mounting element of the second mounting plate and the first mounting element of the second elongate member;
wherein the first mounting element of the first elongate member comprises a first hook and the first mounting element of the second elongate member comprises a first hook;
wherein the first mounting element of the first mounting plate comprises a first edge, the first edge of the first mounting plate located within a slot of the first hook of the first elongate member; and wherein the first mounting, element of the second mounting plate comprises a first edge, the first edge of the second mounting plate located within a slot of the first hook of the second elongate member;
an annular channel formed into the rear surface of the frame;
the first mounting element of the first mounting plate comprising a first edge, the first mounting plate secured to the rear surface of the frame so that the first edge of the first mounting plate overlies the annular channel;
the first mounting element of the second mourning plate comprising a first edge, the second mounting plate secured to the rear surface of the frame so that the first edge of the second mounting plate overlies the annular channel;
the first hook of the first elongate member extending into the annular channel; and
the first hook of the second elongate member extending into the annular channel.

4. The over-the-door hanging apparatus according to claim 3 wherein the first edge of the first mounting plate extends substantially transversely across the annular channel and the first edge of the second mounting plate extends substantially transversely across the annular channel.

5. An over-the-door hanging apparatus comprising:
a frame comprising an outer edge, an inner edge defining a central opening, and a rear surface;
a mirror positioned within the central opening of the frame;
a first mounting plate and a second mounting plate, the first and second mounting plates secured to the rear surface of the frame on opposite sides of a vertical centerline of the frame, the first mounting plate comprising a first mounting element, the second mounting plate comprising a first mounting element;
a first elongate member comprising a first mounting element and a first bracket for slidably engaging a top edge of a door;
a second elongate member comprising a first mounting element and a second bracket for slidably engaging the top edge of the door;
the frame slidably mounted to the first elongate member through slidable mating between at least the first mounting element of the first mounting plate and the first mounting element of the first elongate member;
the frame slidably mounted to the second elongate member through slidable mating between at least the first mounting element of the second mounting plate and the first mounting element of the second elongate member;
wherein the first mounting element of the first elongate member comprises a first hook and the first mounting element of the second elongate member comprises a first hook;
wherein the first mounting element of the first mounting plate comprises a first edge, the first edge of the first mounting plate located within a slot of the first hook of the first elongate member; and wherein the first mounting element of the second mounting plate comprises a first edge, the first edge of the second mounting plate located within a slot of the first hook of the second elongate member;
a first channel formed into the rear surface of the frame;
a second channel formed into the rear surface of the frame;
the first mounting element of the first mounting plate comprising a first edge, the first mounting plate secured to the rear surface of the frame so that the first edge of the first mounting plate overlies the first channel;
the first mounting element of the second mounting plate comprising a first edge, the second mounting plate secured to the rear surface of the frame so that the first edge of the second mounting plate overlies the second channel;
the first hook of the first elongate member extending into the first channel; and
the first hook of the second elongate member extending into the second channel.

6. The over-the-door hanging apparatus according to claim 5 wherein the first edge of the first mounting plate extends substantially transversely across the first channel and the first edge of the second mounting plate extends substantially transversely across the second channel.

7. The over-the-door hanging apparatus according, to claim 2 wherein the first edge of the first mounting plates is formed by a first aperture in the first mounting plate, and the first edge of the second mounting plates is formed by a first aperture in the second mounting plate.

8. The over-the-door hanging apparatus according to claim 1 wherein the first elongate member comprises a first aperture and wherein the second elongate member comprises a first aperture.

9. The over-the-door hanging apparatus according to claim 1 further comprising:
the first bracket and a top portion of the first elongate member collectively forming a generally U-shaped structure having a first angled flange; and
the second bracket and a top portion of the second elongate member collectively forming a generally U-shaped structure having a second angled flange.

10. An over-the-door hanging apparatus comprising:
a frame comprising an outer edge, an inner edge defining, a central opening, and a rear surface;
a flat article positioned within the central opening, of the frame;
a first mounting plate and a second mounting plate, the first and second mounting plates secured to the rear surface of the frame on opposite sides of a vertical centerline of the frame, the first mounting plate comprising a first edge, the second mounting, plate comprising a first edge;
a bracket assembly comprising at least one bracket for engaging a top edge of the door, a first hook, and a second hook;
the frame slidably mounted to the bracket assembly through slidable mating between: (1) the first edge of the first mounting plate and the first hook of the bracket assembly; and (2) the first edge of the second mounting plate and the second hook of the bracket assembly; and
wherein the first mounting plate comprises a raised portion that protrudes from the rear surface of the frame and comprises the first edge of the first mounting plate, the first hook of the bracket assembly inserted between the raised portion of the first mounting plate and the frame;
and wherein the second mounting plate comprises a raised portion that protrudes from the rear surface of the frame and comprises the first edge of the second mounting plate, the second hook of the second elongate member slidably inserted between the raised portion of the second mounting plate and the frame.

11. An over-the-door hanging, apparatus comprising:
a frame comprising an outer edge, an inner edge defining a central opening, and a rear surface;
a flat article positioned within the central opening of the frame;
a first mounting plate and a second mounting plate, the first and second mounting plates secured to the rear surface of the frame on opposite sides of a vertical centerline of the frame, the first mounting plate comprising a first edge, the second mounting plate comprising a first edge, the first edge of the first mounting plate being vertically aligned with the first edge of the second mounting plate;
a bracket assembly comprising at least one bracket for engaging a top edge of the door, a first hook, and a second hook;
the frame slidably mounted to the bracket assembly through slidable mating between: (1) the first edge of the first mounting plate and the first hook of the bracket assembly; and (2) the first edge of the second mounting plate and the second hook of the bracket assembly;
an annular channel formed into the rear surface of the frame;
the first mounting plate secured to the rear surface of the frame so that the first edge of the first mounting plate overlies the annular channel;
the second mounting plate secured to the rear surface of the frame so that the first edge of the second mounting plate overlies the annular channel;
the first hook of the bracket assembly extending into the annular channel; and
the second hook of the bracket assembly extending into the annular channel.

12. The over-the-door hanging apparatus according to claim 11 wherein the first edge of the first mounting plate extends substantially transversely across the annular channel and the first edge of the second mounting plate extends substantially transversely across the annular channel.

13. An over-the-door hanging apparatus comprising:
a frame comprising an outer edge, an inner edge defining a central opening, and a rear surface;
a flat article positioned within the central opening of the frame;
a first mounting plate and a second mounting plate, the first and second mounting plates secured to the rear surface of the frame on opposite sides of a vertical centerline of the frame, the first mounting plate comprising a first edge, the second mounting plate comprising a first edge, the first edge of the first mounting plate being vertically aligned with the first edge of the second mounting plate;
a bracket assembly comprising at least one bracket for engaging a top edge of the door, as first hook, and a second hook;
the frame slidably mounted to the bracket assembly through slidable mating between: (1) the first edge of the first mounting plate and the first hook of the bracket assembly; and (2) the first edge of the second mounting plate and the second hook of the bracket assembly;
a first channel formed into the rear surface of the frame;
a second channel formed into the rear surface of the frame;
the first mounting plate secured to the rear surface of the frame so that the first edge of the first mounting plate overlies the first channel;
the second mounting plate secured to the rear surface of the frame so that the first edge of the second mounting plate overlies the second channel;
the first hook of the bracket assembly extending into the first channel; and
the first hook of the bracket assembly extending into the second channel.

14. The over-the-door hanging apparatus according to claim 13 wherein the first edge of the first mounting plate extends substantially transversely across the first channel and the first edge of the second mounting plate extends substantially transversely across the second channel.

15. The over-the-door hanging apparatus according to claim 13 wherein the first edge of the first mounting plates is formed by a first aperture in the first mounting plate, and the first edge of the second mounting plates is formed by a first aperture in the second mounting plate.

16. The over-the-door hanging apparatus according to claim 10 wherein the bracket assembly comprises:
a first bracket for engaging the top edge of the door, the first bracket having a first angled flange; and
a second bracket for engaging the top edge of the door, the second bracket having a second angled flange.

* * * * *

UNITED STATES PATENT AND TRADEMARK OFFICE
CERTIFICATE OF CORRECTION

PATENT NO. : 8,746,644 B2  
APPLICATION NO. : 14/028839  
DATED : June 10, 2014  
INVENTOR(S) : Matthew S. Kressin Page 1 of 1

It is certified that error appears in the above-identified patent and that said Letters Patent is hereby corrected as shown below:

In the Claims:

Column 17, lines 52-53, delete the text "the first mounting element of the first mounting plate comprising a first edge,"
Column 17, lines 56-57, delete the text "the first mounting element of the second mounting plate comprising a first edge,"
Column 18, lines 41-42, delete the text "the first mounting element of the first mounting plate comprising a first edge,"
Column 18, lines 45-46, delete the text "the first mounting element of the second mounting plate comprising a first edge,"

Signed and Sealed this  
Seventh Day of October, 2014

Michelle K. Lee  
*Deputy Director of the United States Patent and Trademark Office*